(12) United States Patent
Slee

(10) Patent No.: US 9,771,990 B2
(45) Date of Patent: Sep. 26, 2017

(54) BRAKE COMPONENT HANDLING APPARATUS

(71) Applicant: Prowse Holdings Pty Ltd, Gledhow (AU)

(72) Inventor: David Slee, Gledhow (AU)

(*) Notice: Subject to any disclaimer, the term of this patent is extended or adjusted under 35 U.S.C. 154(b) by 106 days.

(21) Appl. No.: 14/742,658

(22) Filed: Jun. 17, 2015

(65) Prior Publication Data
US 2015/0369309 A1 Dec. 24, 2015

(51) Int. Cl.
*B66F 9/06* (2006.01)
*F16D 65/00* (2006.01)
*B66F 9/18* (2006.01)

(52) U.S. Cl.
CPC ............ *F16D 65/0043* (2013.01); *B66F 9/06* (2013.01); *B66F 9/18* (2013.01)

(58) Field of Classification Search
CPC .... B66F 1/08; B66F 1/025; B66F 5/04; B66F 5/00; B66F 7/26; B66F 9/06; B66F 2700/025
See application file for complete search history.

(56) References Cited

U.S. PATENT DOCUMENTS

| | | | | |
|---|---|---|---|---|
| 2,976,033 A | * | 3/1961 | Martin | B25H 1/0007 269/110 |
| 3,218,056 A | * | 11/1965 | Kaplan | B25H 1/0007 269/17 |
| 3,381,953 A | * | 5/1968 | Miller | B60P 3/00 269/17 |
| 4,253,648 A | * | 3/1981 | Meeks | B25B 5/006 269/203 |
| 5,033,717 A | * | 7/1991 | Symon | B66C 23/48 254/124 |
| 5,135,205 A | * | 8/1992 | Bedard | B25H 1/0007 254/100 |
| 5,141,211 A | * | 8/1992 | Adams, Jr. | B60C 25/04 269/16 |
| 5,190,265 A | * | 3/1993 | Barry | B25H 1/0007 254/134 |
| 5,259,602 A | * | 11/1993 | Rogos | B25H 1/0007 269/17 |
| 5,707,450 A | * | 1/1998 | Thompson | B05B 13/0285 118/500 |
| 5,863,034 A | * | 1/1999 | Vauter | B23K 37/04 269/17 |
| 5,897,100 A | * | 4/1999 | Napier | B25H 1/0007 254/124 |

(Continued)

*Primary Examiner* — Joseph J Hail
*Assistant Examiner* — Tyrone V Hall, Jr.
(74) *Attorney, Agent, or Firm* — Tope-McKay & Associates

(57) ABSTRACT

A brake component handling apparatus (10) comprising a frame (12) structure having a plurality of wheels (16). A shaft (14) is supported to extend upwardly from the frame (12). A support member (34) is rotatably secured to the shaft and an engagement member (36) is provided on the support member (34) to engage with a component of a brake assembly. The support member (34) comprises first and second plate members (50, 52) secured parallel and adjacent each other such the first plate member (50) is rotatable relative to the second plate member (52) and a locking mechanism is provided such that the first plate member (50) can be fixed relative to the second plate member (52).

18 Claims, 12 Drawing Sheets

(56) References Cited

U.S. PATENT DOCUMENTS

| | | | | |
|---|---|---|---|---|
| 5,915,742 A * | 6/1999 | Hung | ...................... | B25B 11/02 |
| | | | | 269/17 |
| 6,024,348 A * | 2/2000 | Ventura | ............... | B05B 13/0285 |
| | | | | 269/104 |
| 6,581,908 B1 * | 6/2003 | Francis | ..................... | B66F 3/38 |
| | | | | 254/134 |
| 9,016,664 B1 * | 4/2015 | Powers | ................... | B05C 13/02 |
| | | | | 254/2 B |
| 9,328,860 B1 * | 5/2016 | Hauser | ................... | F16M 11/06 |

* cited by examiner

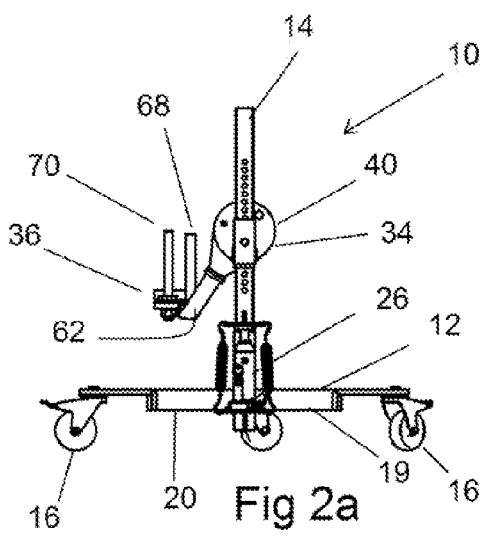
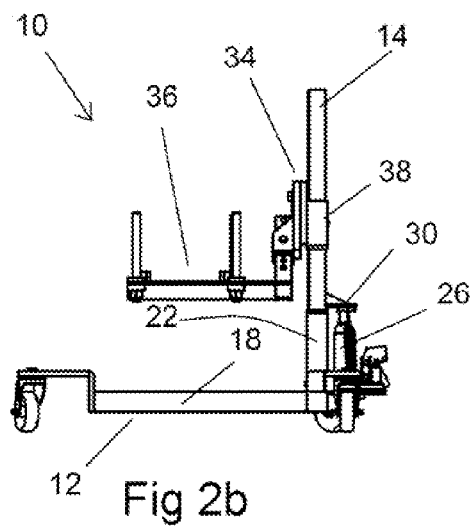
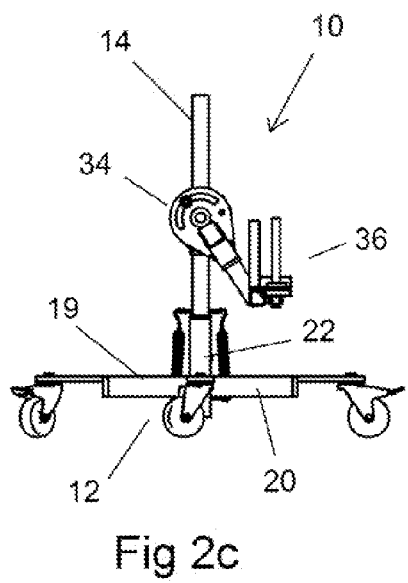

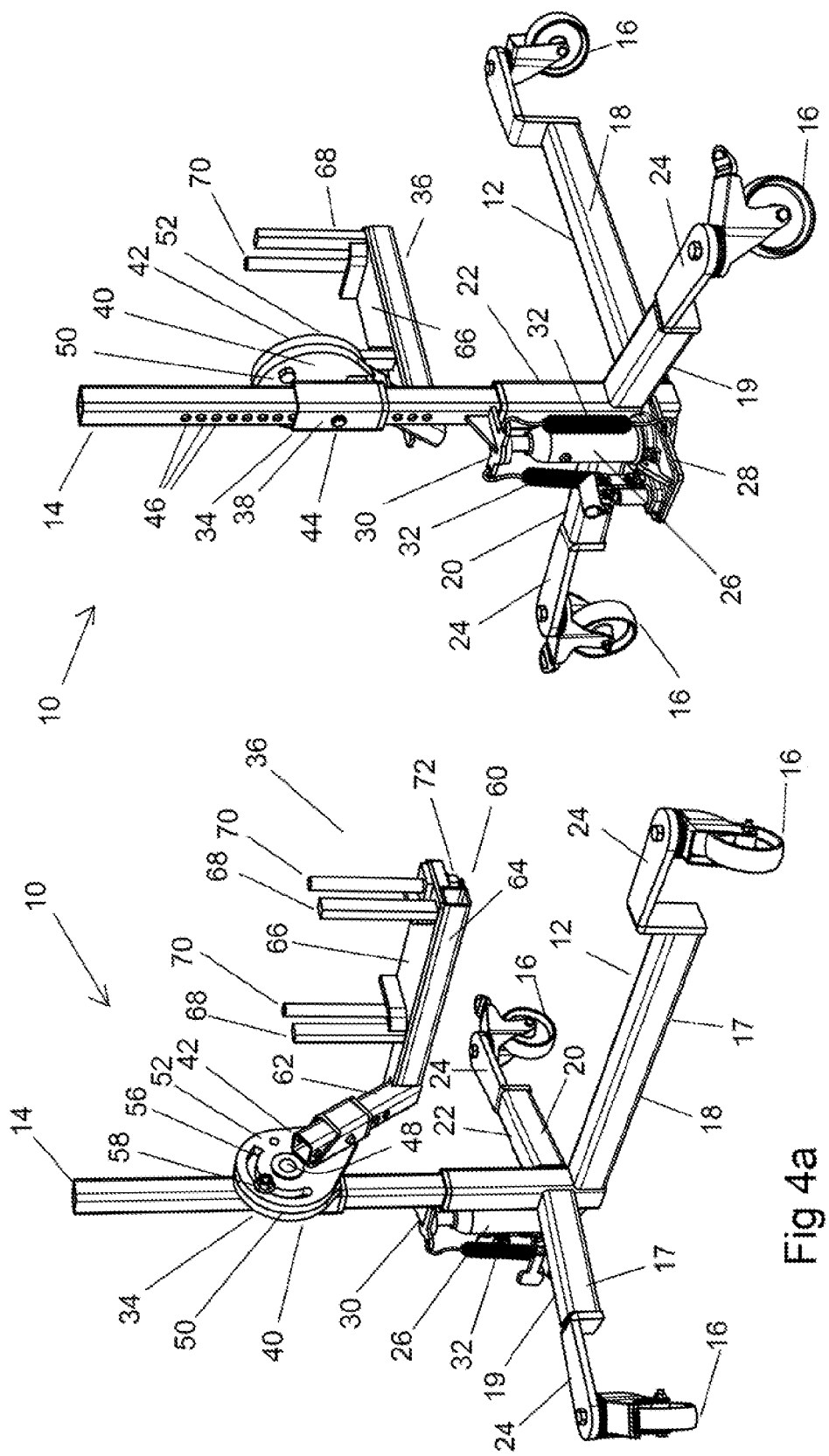

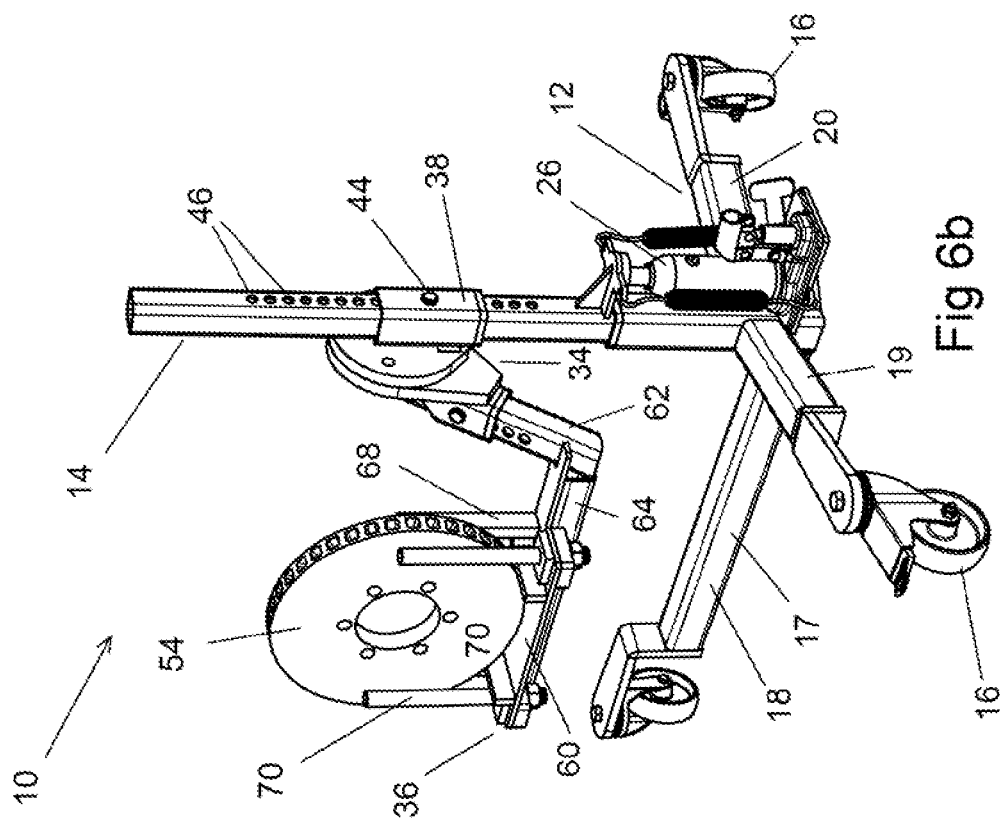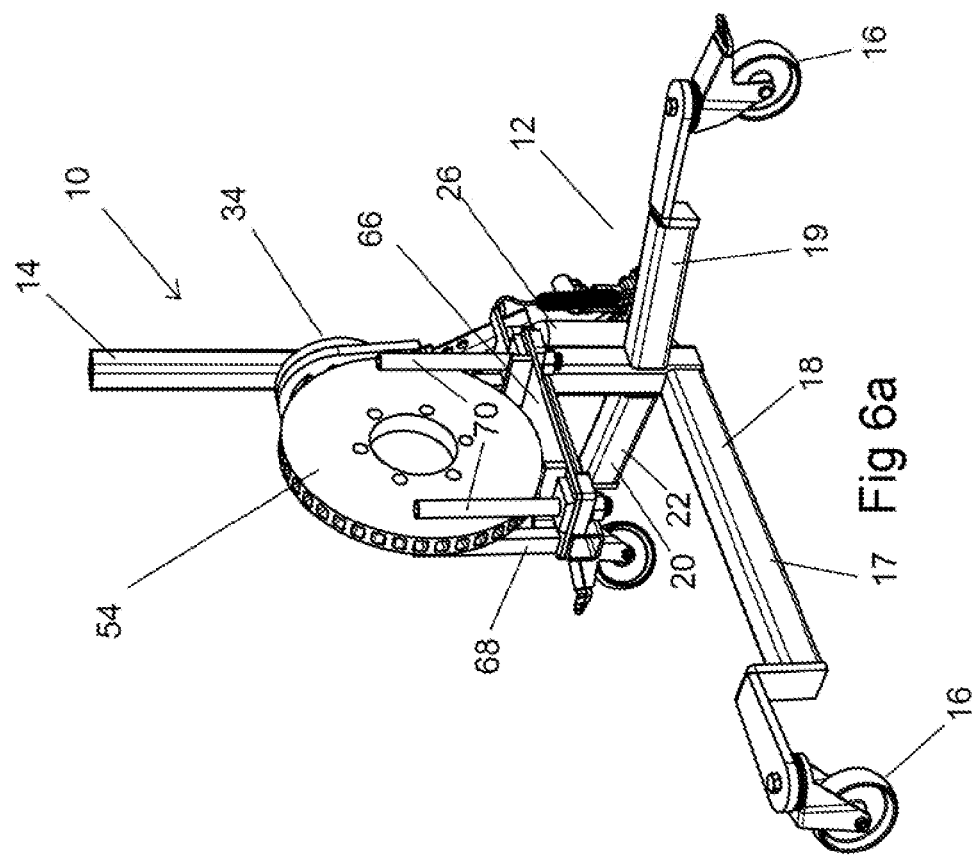

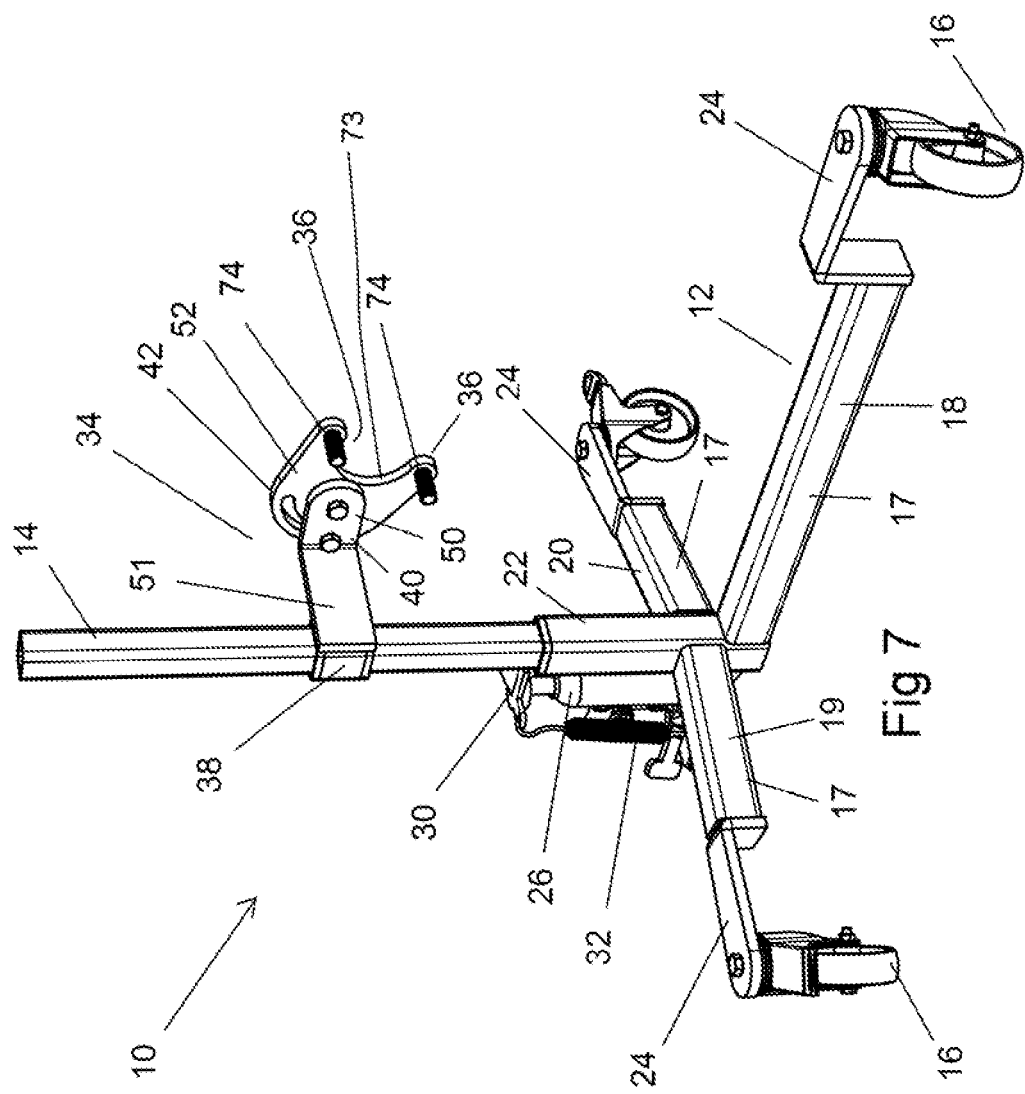

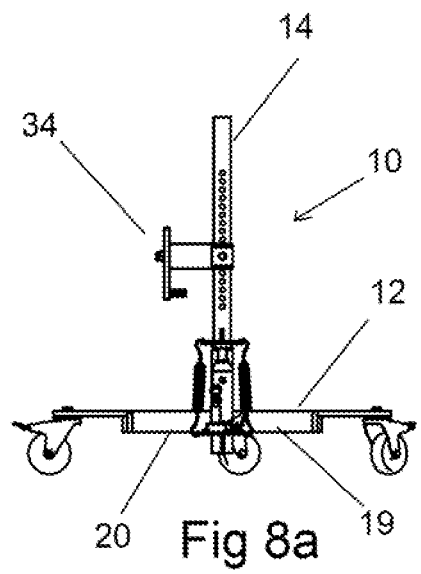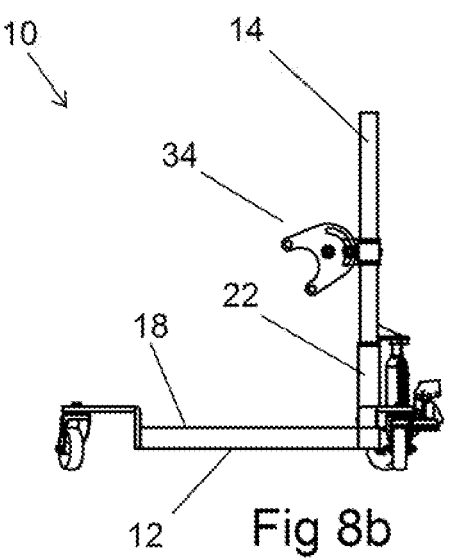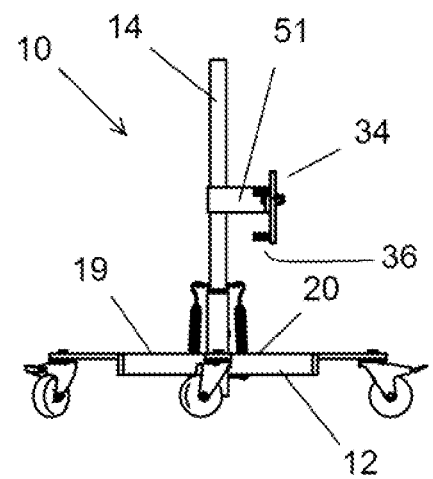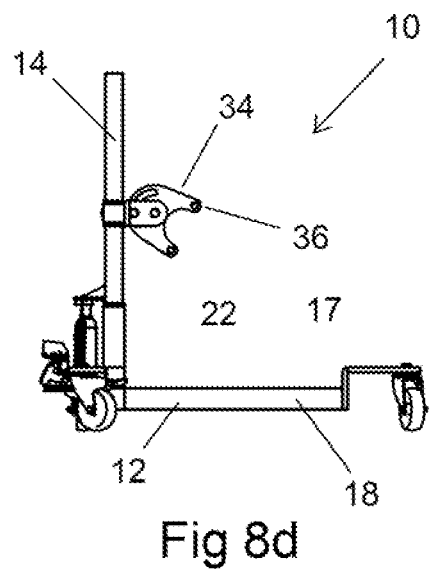

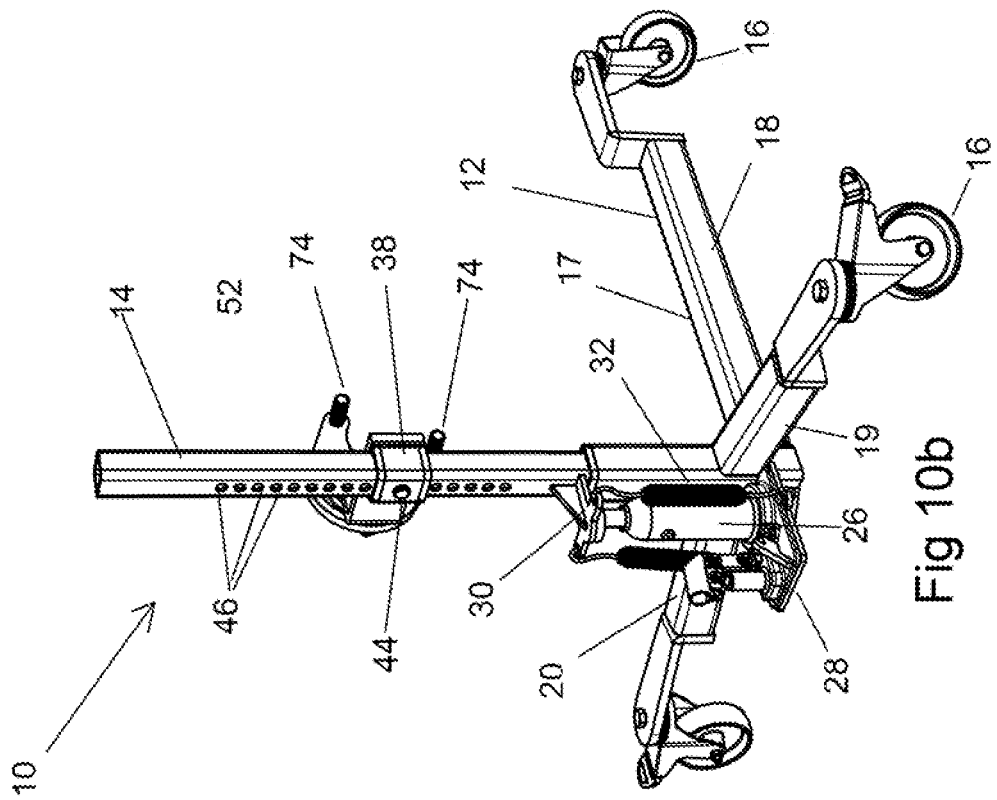
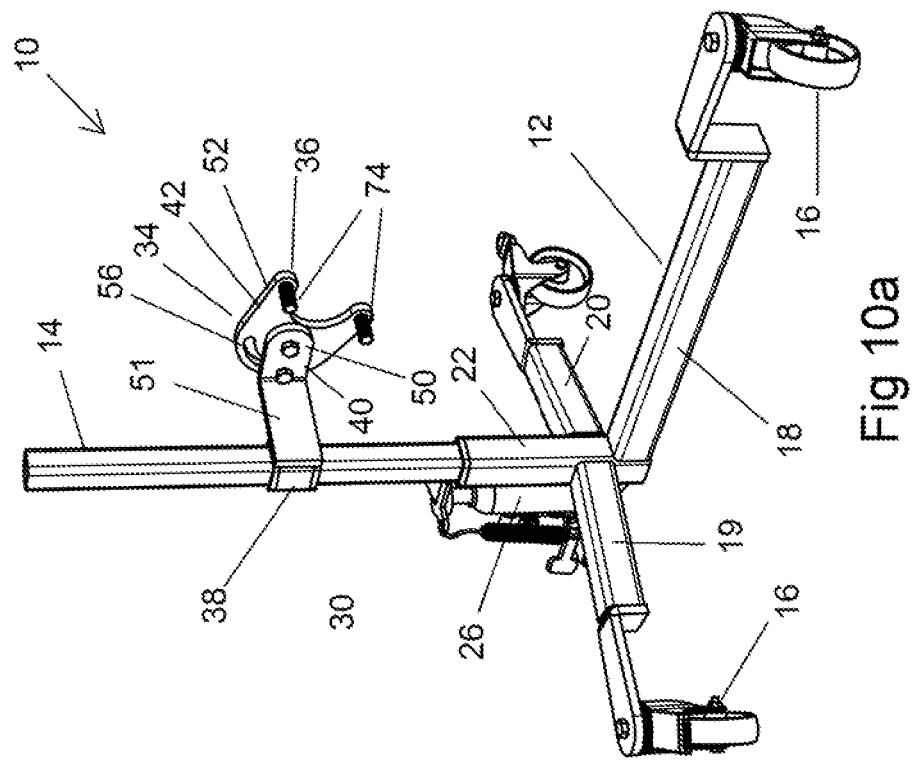

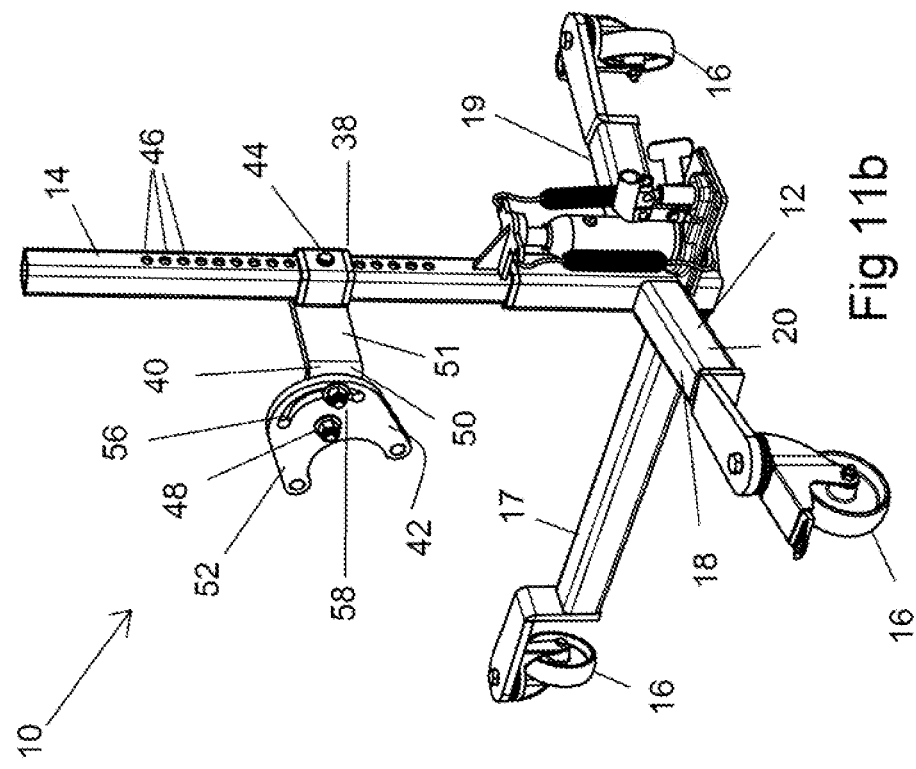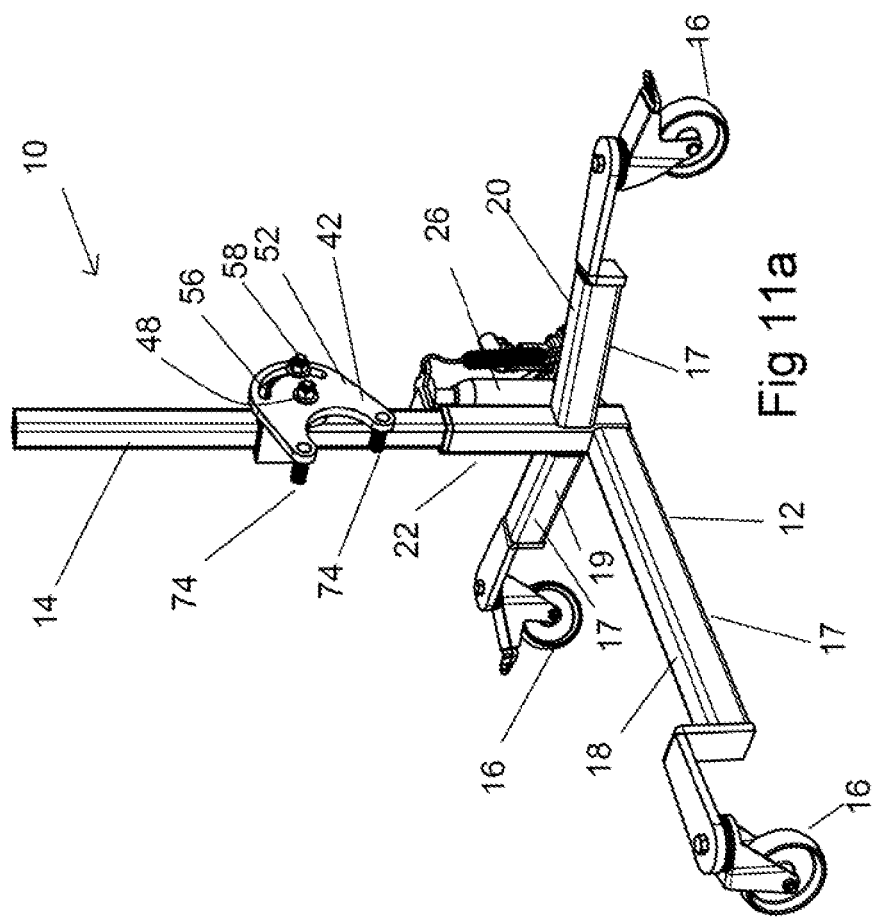

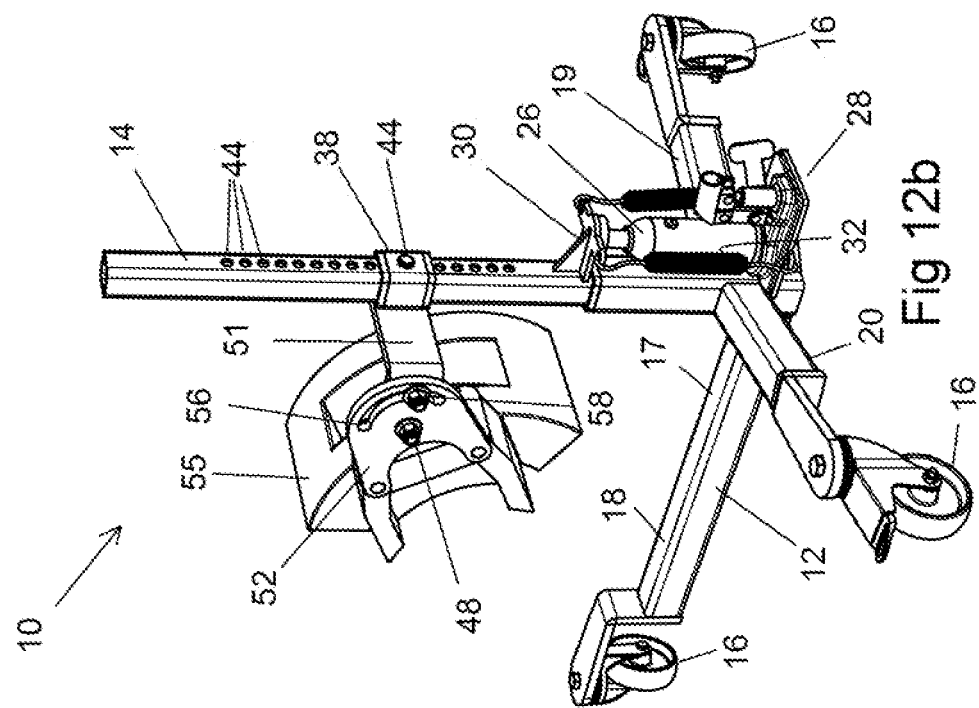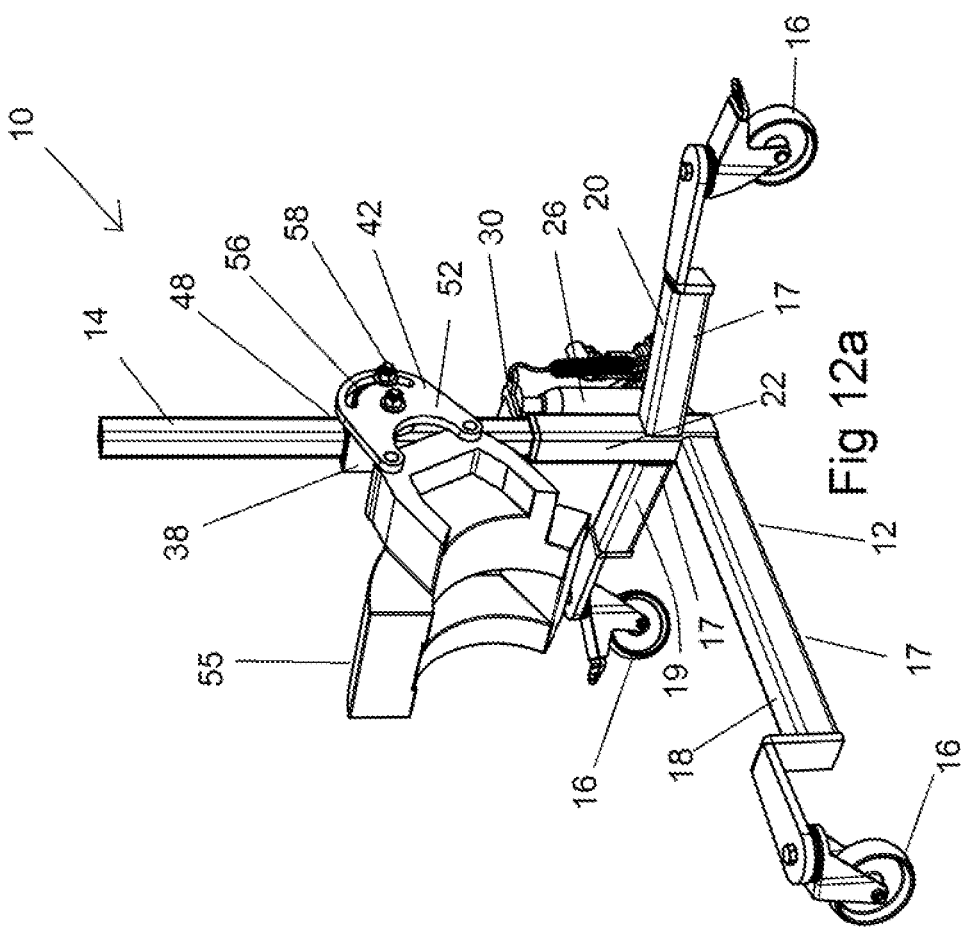

BRAKE COMPONENT HANDLING APPARATUS

FIELD OF THE INVENTION

The present invention relates to a device for supporting and manoeuvring components of a brake assembly of a vehicle.

BACKGROUND OF THE INVENTION

Components of brakes of vehicles need regular maintenance, which will often require removal of the components from the vehicle. In the case of large vehicles, such as trucks, these components can be extremely heavy, making the process of removing and positioning for maintenance difficult.

The present invention relates to apparatus constructed to allow the components of brake assemblies to be supported and manoeuvred into the correct position for servicing, as well as replacement.

SUMMARY OF THE INVENTION

According to one aspect of the present invention there is provided

A brake component handling apparatus comprising:

a frame structure having a plurality of wheels thereon;

a shaft supported to extend upwardly from the frame, the shaft being moveable relative to the frame such that the height of the support member above the ground may be adjusted;

a support member rotatably secured to the shaft; and an engagement member provided on the support member to engage with a component of a brake assembly;

wherein the support member comprises first and second plate members secured parallel and adjacent each other such the first plate member is rotatable relative to the second plate member and a locking mechanism is provided such that the first plate member can be fixed relative to the second plate member.

Preferably the locking mechanism comprises an arcuate slot provided in the second plate member through which a locking pin is received and the locking pin comprises a threaded shaft on which a nut is provided which may be tightened to fix the second plate member relative to the first plate member.

Preferably the first plate member includes a central spindle extending outwardly therefrom to which the second plate member is secured, wherein the first and second plate members are oriented in vertical planes and the spindle extends horizontally.

In one embodiment the engagement member includes an arm member comprising a first arm portion secured to the second plate member to extend generally radially outwardly therefrom and a second arm portion extending from the distal end of the first arm portion parallel to the axis of rotation of the second plate member, wherein the second arm portion includes a support surface onto which an edge of a disc may be placed.

Preferably the support surface comprises a planar surface extending along a side of the second arm portion 4 such that the support surface is parallel to the longitudinal axis of the second arm portion.

Preferably the support surface includes a first pair of support rods and a second pair of support rods securable adjacent the first support rods such that each pair of first and second support rods defines a gap into which an edge of the brake disc may be received.

Preferably, the second support ods are moveable relative to the support surface such that the size of the gap created between the first and second support rods may be varied.

In one embodiment, the second support rods are removable from and attachable to the second arm portion.

In one embodiment, ends of the second support rods are receivable through openings in the support surface and secured by securing nuts, the openings comprising slots such that the second support rods may be moved towards or away from the first support rods by loosening the securing nuts.

In a further embodiment, the second plate member is generally U-shaped and includes a pair of bolts provided to be received in openings in a brake caliper.

Preferably the second plate member of the engagement member includes a concaved edge on an end thereof to define the U-shape.

Preferably the concaved edge defines a pair of finger portion which the pair of bolts extend.

In a preferred embodiment, the frame includes a tube member provided such that the shaft is slidably received in an open upper end thereof.

Preferably an adjustment mechanism is provided to engage with the shaft and move the shaft relative to the tube member, thereby varying the height of the shaft.

In one embodiment, the adjustment mechanism comprises a lifting device secured to the frame and engaged with the shaft.

In one embodiment, the lifting device comprises a jack provided on a platform extending outwardly from the tube member and an upper end of the jack engages a flange on the shaft such that operation of the jack exerts a force upwardly on the flange, thereby raising the shaft relative to the frame.

In a preferred embodiment, the frame is formed of a plurality of elongate frame members connected together adjacent first ends thereof such that the frame members extend generally horizontally in use and include wheels adjacent second ends thereof.

Preferably there is provided a first frame member connected at the first end thereof to a tube member and second and third frame members also connected at first ends thereof to the tube member such that the second and third frame members are each oriented to extend at an obtuse angle to the first frame member.

BRIEF DESCRIPTION OF THE DRAWINGS

The invention will now be described, by way of example, with reference to the following drawings in which:

FIG. 2a is a rear view of the brake component handling apparatus of FIG. 1;

FIG. 2b is a left side view of the brake component handling apparatus of FIG. 1;

FIG. 2c is a front view of the brake component handling apparatus of FIG. 1;

FIG. 2d is a rear view of the brake component handling apparatus of FIG. 1;

FIG. 4a is a right front perspective view of the brake component handling apparatus of FIG. 1;

FIG. 4b is a right rear perspective view of the brake component handling apparatus of FIG. 1;

FIG. 6a is a left front perspective view of the brake component handling apparatus of FIG. 1 shown holding a brake disc;

FIG. 6b is a left rear perspective view of the brake component handling apparatus of FIG. 1 shown holding the brake disc;

FIG. 7 is a front perspective view of a second embodiment of a brake component handling apparatus in accordance with the present invention;

FIG. 8a is a rear view of the brake component handling apparatus of FIG. 7;

FIG. 8b is a leftside view of the brake component handling apparatus of FIG. 7;

FIG. 8c is a front view of the brake component handling apparatus of FIG. 7;

FIG. 8d is a right side view of the brake component handling apparatus of FIG. 7;

FIG. 10a is a right front perspective view of the brake component handling apparatus of FIG. 7;

FIG. 10b is a right rear perspective view of the brake component handling apparatus of FIG. 7;

FIG. 11a is a left front perspective view of the brake component handling apparatus of FIG. 7;

FIG. 11b is a left rear perspective view of the brake component handling apparatus of FIG. 7;

FIG. 12a is a left front perspective view of the brake component handling apparatus of FIG. 7 shown holding a brake caliper; and FIG. 12b is a left rear perspective view of the brake component handling apparatus of FIG. 7 shown holding the brake caliper.

DETAILED DESCRIPTION OF PREFERRED EMBODIMENTS

Figure 1:
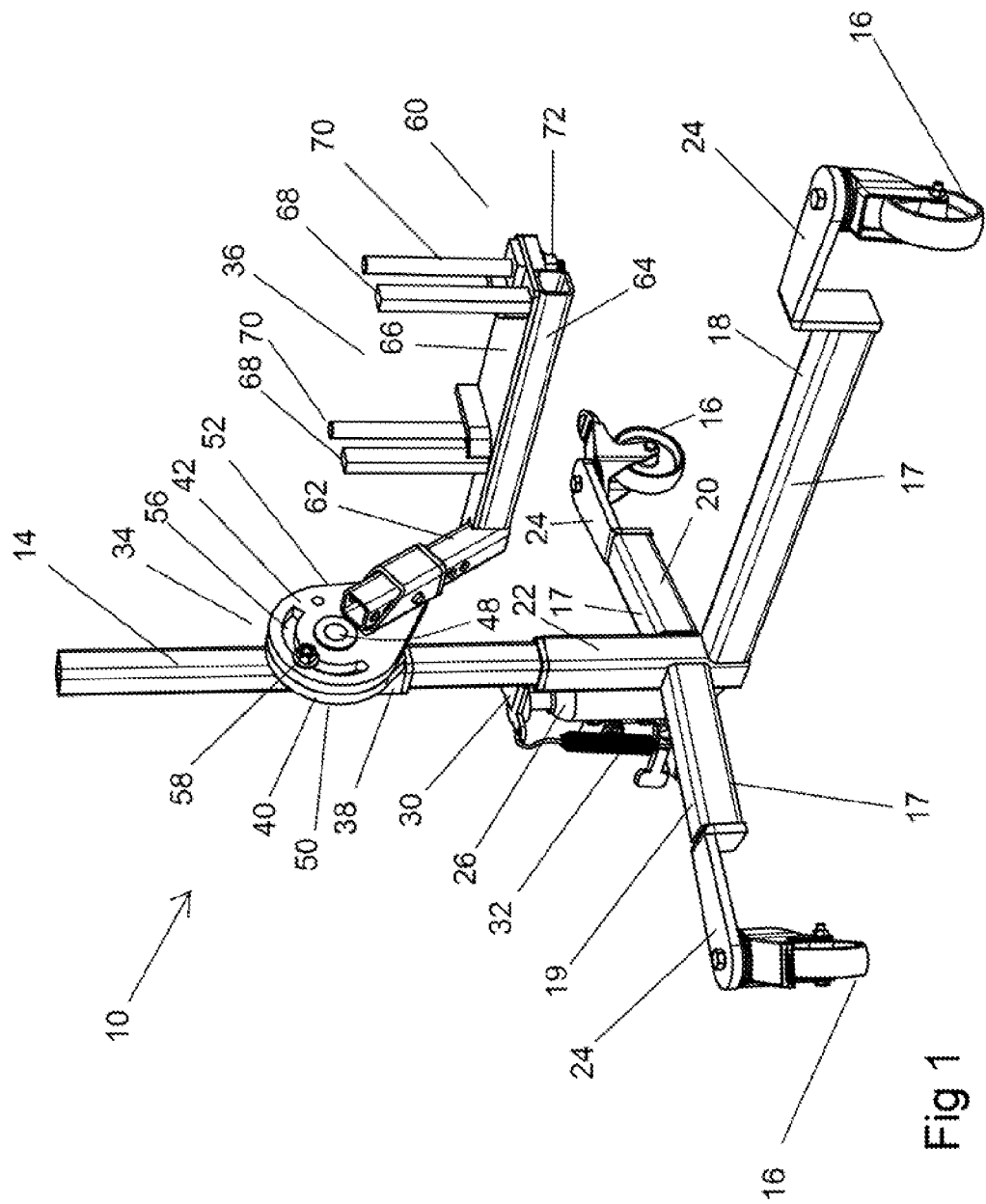
FIG. 1 is a front perspective view of a brake component handling apparatus in accordance with the present invention in a first configuration.
Figure 3A:
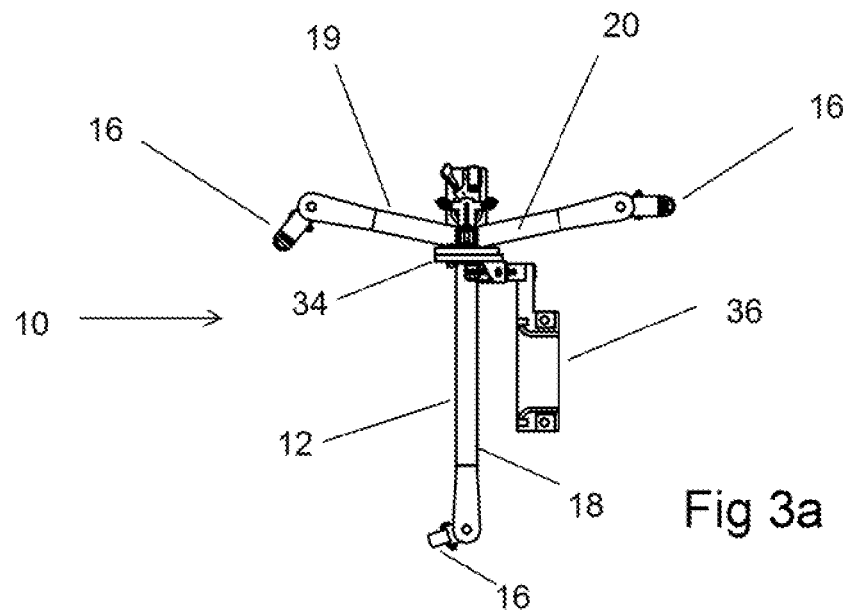
FIG. 3a is a top view of the brake component handling apparatus of FIG. 1.
Figure 3B:
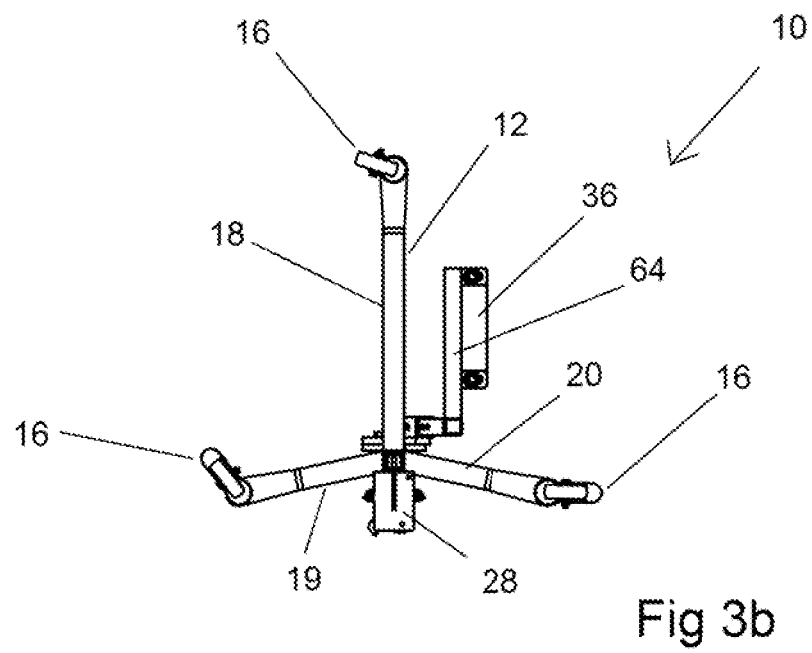
FIG. 3b is a bottom view of the brake component handling apparatus of FIG. 1.

Referring to the Figures, there is shown a brake component handling apparatus 10 comprising generally a frame 12 and a shaft 14 extending from the frame 12. The frame 12 is provided to rest on the ground and includes a plurality of wheels 16 thereon, such that the frame 12 can be moved around. The shaft 14 extends upwardly from the frame 12.

The frame 12 is formed of a plurality of frame members 17. Each of the frame members 17 comprises an elongate tubular member. In the embodiment shown, each of the frame members 17 comprises a length of tube having a rectangular cross section. The frame members 17 are connected together adjacent first ends thereof such that the frame members 17 extend generally horizontally in use. The wheels 16 are provided connected to each of the frame members 17 adjacent second ends thereof.

In the embodiment shown, there is provided a first frame member 18, a second frame member 19 and a third frame member 20. The first frame member 18 is connected at the first end thereof to a tube member 22. The tube member 22 is connected perpendicularly to the first frame member 18 such that when the first frame member 18 is oriented horizontal and parallel to the ground, the tube member 22 extends vertically.

The second and third frame members 19 and 20 are also connected at first ends thereof to the tube member 22. The second and third frame members 19 and 20 are connected perpendicularly to the tube member 22 such that when the second and third frame members 19 extend horizontal and parallel to the ground, the tube member 22 is vertical.

The second and third frame members 19 and 20 are each oriented to extend at an obtuse angle to the first frame member 18. The angle between the first frame member 18 and the second frame member 19 is the same as the angle between the first frame member 18 and the third frame member 20.

Each of the frame members 17 includes a wheel bracket 24 at a distal end thereof. The wheel brackets 24 comprise plates extending horizontally outwardly from the distal ends of the frame members 17. The wheels 16 are secured to the lower sides of the plates as can be seen in the Figures. The frame 12 thereby provides a stable, horizontal, moveable base for the brake component handling apparatus 10.

The tube member 22 is hollow and open at an upper end thereof such that a lower end of the shaft 14 may be received into the tube member 22 by sliding. The shaft 14 may be slid relative to the tube member 22 to adjust the height by which the shaft 14 extends above the frame 12. An adjustment mechanism is provided to engage with the shaft 14 and move the shaft 14 relative to the tube member 22, thereby varying the height of the shaft 14.

In the embodiment shown, the adjustment mechanism comprises a lifting device secured to the frame 12 and engaged with the shaft 14. The lifting device comprises a jack 26. A platform 28 is provided extending outwardly from the tube member 22 on a side thereof opposite the first frame member 18. The jack 26 is located on the platform 28. A flange 30 is provided on the shaft 14 extending outwardly therefrom above the jack 26. The upper end of the jack 26 engages the flange 30 such that operation of the jack 26 exerts a force upwardly on the flange 30, thereby raising the shaft 14 relative to the frame 12. Springs 32 are also provided connecting between the flange 30 and the platform 28 to keep the platform 28 and flange 30 in engagement with the jack 26.

The brake component handling apparatus 10 is provided also with a support member 34 and an engagement member 36. The support member 34 is rotatably connected to the shaft 14 and supports the engagement member 36. The engagement member 36 is provided to engage with the component of the brake assembly.

The support member 34 comprises a first portion 40 supported from the shaft 14 and a second portion 42 mounted for rotation relative to the first portion 40. Referring to FIGS. 1 to 5, the first portion 40 comprises a disc shaped first plate member 50 secured to the shaft 14 by a tubular bracket 38. The tubular bracket 38 receives the shaft 14 and is slidable relative to the shaft 14. A securing bolt 44 is provided in the tubular bracket 38 which can be received in one of a plurality of holes 46 provided along the length of the shaft 14 to allow the support member 34 to be positioned at the desired location on the shaft 14.

The second portion 42 of the support member 34 comprises a disc shaped second plate member 52. The second plate member 52 is fixed parallel and adjacent the first plate member 50 such that the second plate member 52 can rotate relative to the first plate member 50. The first plate member 50 includes a central spindle 48 extending outwardly therefrom to which the second plate member 52 is secured. The first and second plate members 50 and 52 are oriented in vertical planes and the spindle 48 extends horizontally.

The support member 34 is provided with a locking mechanism such that the first portion 40 thereof can be fixed relative to the second portion 42 thereof. The locking mechanism comprises an arcuate slot 56 provided in the second plate member 52 through which a locking pin 58 is received. The locking pin 58 comprises a threaded shaft on which a nut is provided. The second plate member 52 may therefore be rotated relative to the first plate member 52 and the locking pin 58 will move within the slot 56. Once positioned at the desired orientation. The nut may be tightened to fix the second plate member 52 relative to the first plate member 50.

Figure 5B:
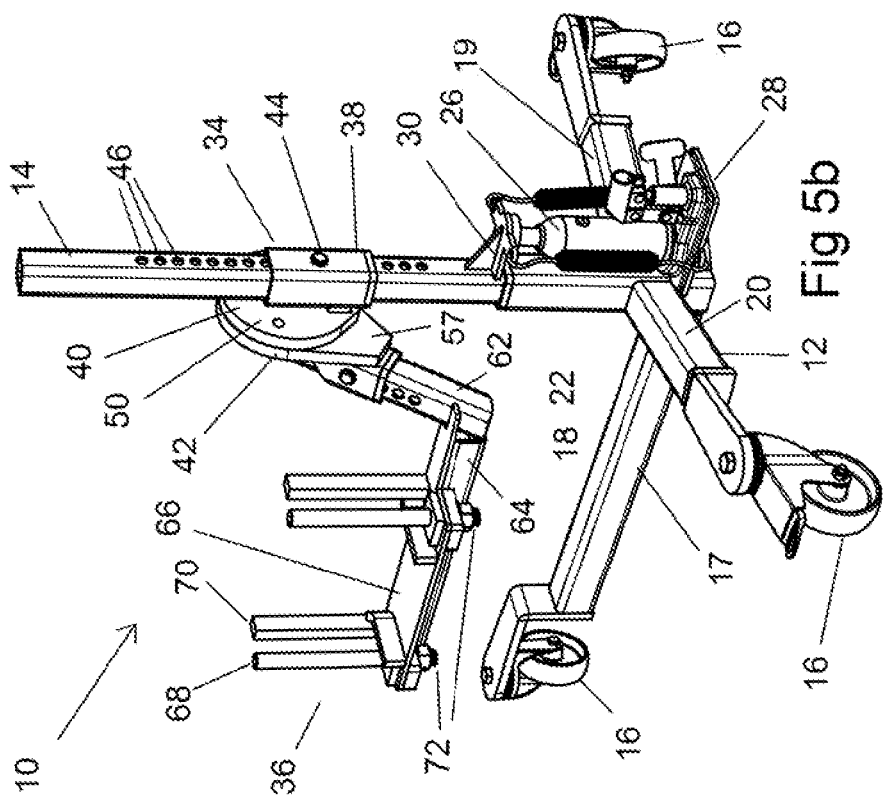
FIG. 5b is a left rear perspective view of the brake component handling apparatus of FIG. 1.
Figure 5A:
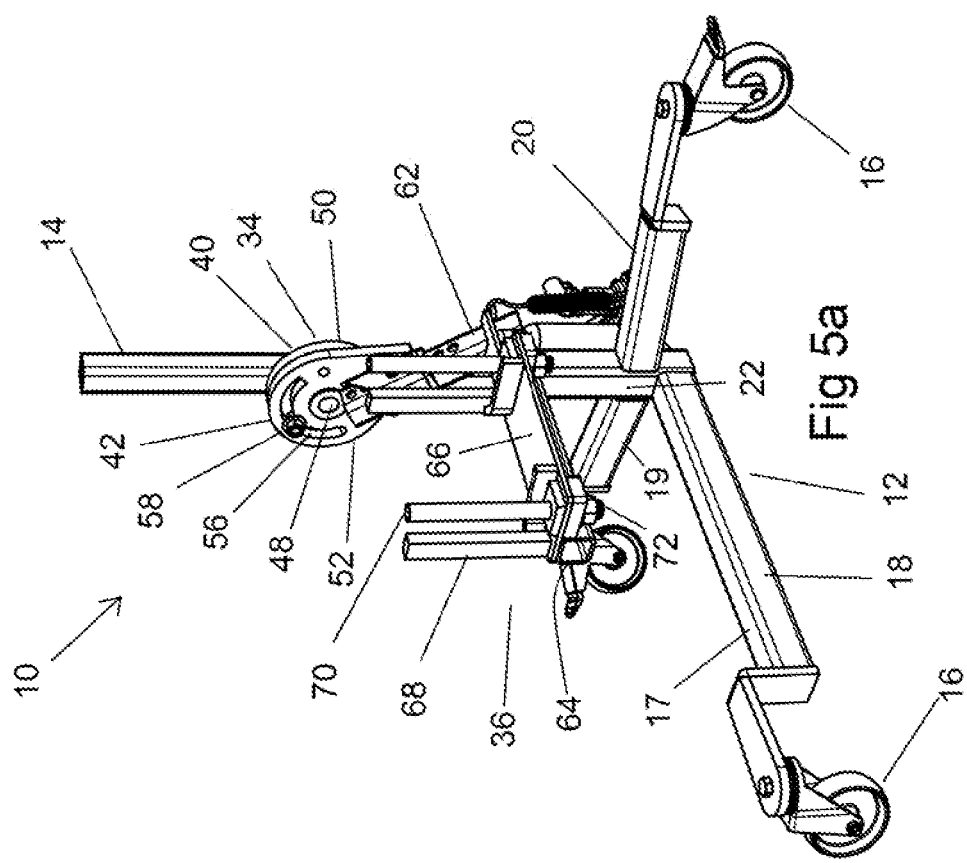
FIG. 5a is a left front perspective view of the brake component handling apparatus of FIG. 1.
Figure 9A:
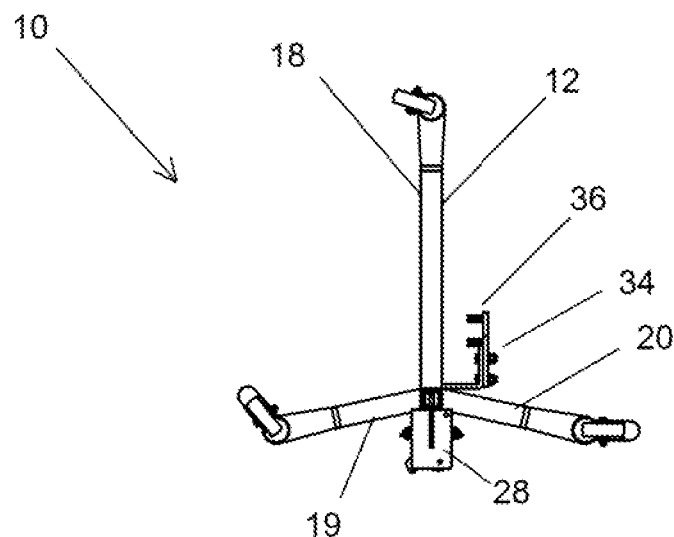
FIG. 9a is a bottom view of the brake component handling apparatus of FIG. 7.
Figure 9B:
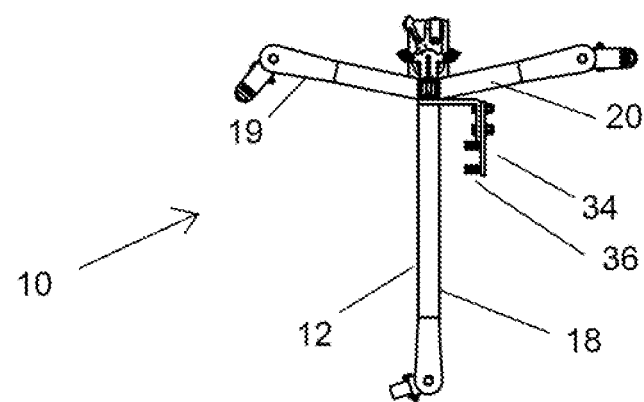
FIG. 9b is a top view of the brake component handling apparatus of FIG. 7.

In the embodiment of FIGS. 1 to 6, the engagement member 36 is provided to engage with a disc 54 of a brake assembly, as can be seen in FIG. 5. The engagement member 36 comprises an arm member 60 secured to the second plate member 52. The arm member 60 includes a first arm portion 62 secured to the second plate member 52 to extend generally radially outwardly therefrom. A second arm portion 64 extends from the distal end of the first arm portion 62 parallel to the axis of rotation of the second plate member 52.

The second arm portion 64 includes a support surface 66 onto which an edge of the disc 54 can be placed. The support surface 66 comprises a planar surface extending along a side of the second arm portion 64 such that the support surface is parallel to the longitudinal axis of the second arm portion 64.

The second arm portion 64 includes also a first pair of support rods 68. The first support rods 68 extend transversely outward from opposed ends of the support surface 66. Also provided is a second pair of support rods 70. Each of the second support rods 70 is securable adjacent one of the first support rods 68 such that each pair of first and second support rods 68 and 70 defines a gap into which an edge of the brake disc 54 may be received.

The second support rods 70 are removable from and attachable to the second arm portion 64. The second support rods 70 are moveable relative to the support surface 66 such that the size of the gap created between the first and second support rods 68 and 70 may be varied.

In the embodiment shown, ends of the second support rods 70 are receivable through openings in the support surface 66 and secured by securing nuts 72. The openings comprise slots such that the second support rods 70 may be moved towards or away from the first support rods 68 by loosening the securing nuts 72.

In the embodiment of FIGS. 7 to 12, the support member 34 and the engagement member 36 are modified to engage with a brake caliper 55 rather than the disc 54.

The support member 34 of FIGS. 7 to 12 also comprises a first portion 40 supported from the shaft 14 and a second portion 42 mounted for rotation relative to the first portion 40. The first portion 40 comprises also a first plate member 50 secured to the shaft 14 by a tubular bracket 38. An extension plate 51 is provided extending outwardly from the tubular member 38 and the first plate member 50 is secured transversely to a distal end of the extension plate 51.

The second portion 42 of the support member 34 comprises a second plate member 52. The second plate member 52 is generally U-shaped however in the embodiment of FIGS. 7 to 12. The second plate member 52 is fixed parallel and adjacent the first plate member 50 such that the second plate member 52 can rotate relative to the first plate member 50. The first plate member 50 includes a central spindle 48 extending outwardly therefrom to which the second plate member 52 is secured. The first and second plate members 50 and 52 are oriented in vertical planes and the spindle 48 extends horizontally.

The second plate member 52 of the engagement member 36 includes a concaved edge 73 on an end thereof which defines the U-shape. The concaved edge 73 defines a pair of finger portions on which are provided a pair of bolts 74. The bolts 72 extend transversely outwardly from the second plate member 52. The bolts 74 are spaced apart by the correct distance to be received in openings provided in the brake caliper 55, thereby supporting the brake caliper 55 from the engagement member 36.

In use, the brake component handling apparatus 10 is used by positioning the frame 12 alongside the component to be engaged and supported. The engagement member 36 is located alongside the component at the correct height by adjusting the position of the support member 34 on the shaft 14. The angular orientation of the engagement member 36 is adjusted by rotation of the support member 34. In the case of the first embodiment, the engagement member 36 is moved until the disc 54 rests on the support surface 66 between the first and second support rods 68 and 70. In the case of the brake caliper 55, the frame 12 is moved so the bolts 74 can engage with the brake caliper 55.

Once the component is engaged and supported by the engagement member 36, it may be moved away from the vehicle for servicing. The second portion 42 of the support member 34 may be rotated relative to the first portion 40 to provide the best access to the component. The position may also be moved by moving the frame 12 on the wheels 16, or adjusting the height by operation of the jack 26.

It will be readily apparent to persons skilled in the relevant arts that various modifications and improvements may be made to the foregoing embodiments, in addition to those already described, without departing from the basic inventive concepts of the present invention.

What is claimed is:
1. A brake component handing apparatus comprising:
a frame structure having a plurality of wheels thereon;
a shaft supported to extend upwardly from the frame, the shaft being moveable relative to the frame such that a height of a support member above the ground may be adjusted;
the support member rotatably secured to the shaft, the support member comprising first and second plate members secured parallel and adjacent each other such that the first plate member is rotatable relative to the second plate member, and a locking mechanism provided such that the first plate member can be fixed relative to the second plate member; and
an engagement member provided on the support member to engage with a component of a brake assembly; wherein the engagement member comprises a first arm portion secured to a second plate member and a second arm portion extending from a distal end of the first arm portion and comprises a support surface wherein the support surface has first and second pairs of support rods defining a gap into which an edge of the component may be received, the second support rods being movable relative to the support surface such that a size of the gap created between the first and second support rods may be varied, and at least one of the second support rods being removable from and attachable to the engagement member.

2. The brake component handling apparatus in accordance with claim 1, wherein the locking mechanism comprises an arcuate slot provided in the second plate member through which a locking pin is received, and the locking pin comprises a threaded shaft on which a nut is provided which may be tightened to fix the second plate member relative to the first plate member.

3. The brake component handling apparatus in accordance with claim 2, wherein the first plate member includes a central spindle extending outwardly therefrom to which the second plate member is secured, wherein the first and second plate members are oriented in vertical planes and the spindle extends horizontally.

4. The brake component handling apparatus in accordance with claim 3, wherein the first arm portion extends generally radially outwardly from the second plate member and the second arm portion extends from the first arm portion parallel to an axis of rotation of the second plate member.

5. The brake component handling apparatus in accordance with claim 4, wherein the support surface comprises a planar surface extending along a side of the second arm portion such that the support surface is parallel to a longitudinal axis of the second arm portion.

6. The brake component handling apparatus in accordance with claim 1, wherein ends of the second support rods are receivable through openings in the support surface and secured by securing nuts, the openings comprising slots such that the second support rods may be moved towards or away from the first support rods by loosening the securing nuts.

7. The brake component handling apparatus in accordance with claim 1, wherein the frame includes a tube member provided such that the shaft is slidably received in an open upper end thereof.

8. The brake component handling apparatus in accordance with claim 7, wherein an adjustment mechanism is provided to engage with the shaft and move the shaft relative to the tube member, thereby varying a height of the shaft.

9. The brake component handling apparatus in accordance with claim 8, wherein the adjustment mechanism comprises a lifting device secured to the frame and engaged with the shaft.

10. The brake component handling apparatus in accordance with claim 9, wherein the lifting device comprises a jack provided on a platform extending outwardly from the tube member and an upper end of the jack engages a flange on the shall such that operation of the jack exerts a force upwardly on the flange, thereby raising the shall relative to the frame.

11. The brake component handling apparatus in accordance with claim 10, wherein the frame is formed of a plurality of elongate frame members connected together adjacent first ends thereof such that the frame members extend generally horizontally in use and include wheels adjacent second ends thereof.

12. The brake component handling apparatus in accordance with claim 11, wherein there is provided a first frame member connected at the first end thereof to a tube member and second and third frame members also connected at first ends thereof to the tube member such that the second and third frame members are each oriented to extend at an obtuse angle to the first frame member.

13. A brake component handling apparatus comprising:
a frame structure having a plurality of wheels thereon;
a shaft supported to extend upwardly from the frame, the shaft being moveable relative to the frame such that a height of the support member above the ground may be adjusted;
a support member rotatably secured to the shaft the support member comprising first and second plate members secured parallel and adjacent each other such the first plate member is rotatable relative to the second plate member and a locking mechanism provided such that the first plate member can be fixed relative to the second plate member; and
an engagement member provided on the support member to engage with a component of a brake assembly;
wherein the engagement member includes an arm member comprising a first arm portion secured to the second plate member to extend generally radially outwardly therefrom and a second arm portion extending from a distal end of the first arm portion parallel to an axis of rotation of the second plate member, wherein the second arm portion includes a support surface for receiving the component of the brake assembly.

14. The brake component handling apparatus in accordance with claim 13, wherein the support surface comprises a planar surface extending along a side of the second arm portion such that the support surface is parallel to a longitudinal axis of the second arm portion.

15. The brake component handling apparatus in accordance with claim 14, wherein first and second pairs of support rods are provided on the support surface defining a gap into which an edge of the disc may be received, the second support rods being moveable relative to the support surface such that a size of the gap created between the first and second support rods may be varied and at least one of the second support rods being removable from and attachable to the engagement member.

16. A brake component handling apparatus comprising:
a frame structure having a plurality of wheels thereon;
a shall supported to extend upwardly from the frame, the shaft being moveable relative to the frame such that a height of the support member above the ground may be adjusted;
a support member rotatably secured to the shaft the support member comprising first and second plate members secured parallel and adjacent each other such the first plate member is rotatable relative to the second plate member and a locking mechanism provided such that the first plate member can be fixed relative to the second plate member; and
an engagement member provided on the support member to engage with a component of a brake assembly;
wherein the first plate member is secured to a distal end of an extension plate extending horizontally a slidable connection to the shaft such that the first and second plates are oriented vertically and wherein the second plate member is U-shaped and includes a pair of bolts provided to be received in openings in a brake caliper.

17. The brake component handling apparatus in accordance with claim 16, wherein the second plate member of the engagement member includes a concaved edge on an end thereof to define the U-shape.

18. The brake component handling apparatus in accordance with claim 17, wherein the concaved edge defines a pair of finger portions from which the pair of bolts extend.

* * * * *